(12) United States Patent
Gabrielov et al.

(10) Patent No.: US 10,099,208 B2
(45) Date of Patent: Oct. 16, 2018

(54) HYDROPROCESSING CATALYST PREPARED WITH WASTE CATALYST FINES AND ITS USE

(71) Applicant: SHELL OIL COMPANY, Houston, TX (US)

(72) Inventors: Alexei Grigorievich Gabrielov, Houston, TX (US); Ed Ganja, The Woodlands, TX (US); Salvatore Philip Torrisi, The Woodlands, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/648,802

(22) Filed: Jul. 13, 2017

(65) Prior Publication Data

US 2017/0312741 A1 Nov. 2, 2017

Related U.S. Application Data

(62) Division of application No. 14/936,005, filed on Nov. 9, 2015, now Pat. No. 9,724,679, which is a division of application No. 13/208,148, filed on Aug. 11, 2011, now Pat. No. 9,211,536.

(60) Provisional application No. 61/373,472, filed on Aug. 13, 2010.

(51) Int. Cl.
| | | |
|---|---|---|
| *B01J 23/85* | (2006.01) |
| *B01J 23/882* | (2006.01) |
| *B01J 23/883* | (2006.01) |
| *B01J 23/888* | (2006.01) |
| *B01J 27/19* | (2006.01) |
| *B01J 35/00* | (2006.01) |
| *B01J 35/02* | (2006.01) |
| *B01J 35/10* | (2006.01) |
| *B01J 37/02* | (2006.01) |
| *B01J 37/04* | (2006.01) |
| *B01J 37/18* | (2006.01) |
| *B01J 37/20* | (2006.01) |
| *C10G 45/08* | (2006.01) |
| *C10G 49/04* | (2006.01) |

(52) U.S. Cl.
CPC ............... *B01J 27/19* (2013.01); *B01J 23/85* (2013.01); *B01J 23/882* (2013.01); *B01J 23/883* (2013.01); *B01J 23/888* (2013.01); *B01J 23/8885* (2013.01); *B01J 35/002* (2013.01); *B01J 35/1014* (2013.01); *B01J 35/1019* (2013.01); *B01J 35/1042* (2013.01); *B01J 35/1047* (2013.01); *B01J 35/1061* (2013.01); *B01J 37/0201* (2013.01); *B01J 37/0203* (2013.01); *B01J 37/0236* (2013.01); *B01J 37/18* (2013.01); *B01J 37/20* (2013.01); *C10G 45/08* (2013.01); *C10G 49/04* (2013.01); *B01J 35/026* (2013.01); *B01J 37/04* (2013.01)

(58) Field of Classification Search
None
See application file for complete search history.

*Primary Examiner* — Colin W. Slifka
(74) *Attorney, Agent, or Firm* — Charles W. Stewart

(57) ABSTRACT

A hydroprocessing catalyst composition that comprises a shaped support that is formed from a mixture of inorganic oxide powder and catalyst fines and wherein the shaped support has incorporated therein at least one metal component, a chelating agent and a polar additive. The hydroprocessing catalyst composition is prepared by incorporating into the shaped support a metal component, a chelating agent and a polar additive. The hydroprocessing catalyst composition has particular application in the catalytic hydroprocessing of petroleum derived feedstocks.

6 Claims, 1 Drawing Sheet

HYDROPROCESSING CATALYST PREPARED WITH WASTE CATALYST FINES AND ITS USE

Figure 1:
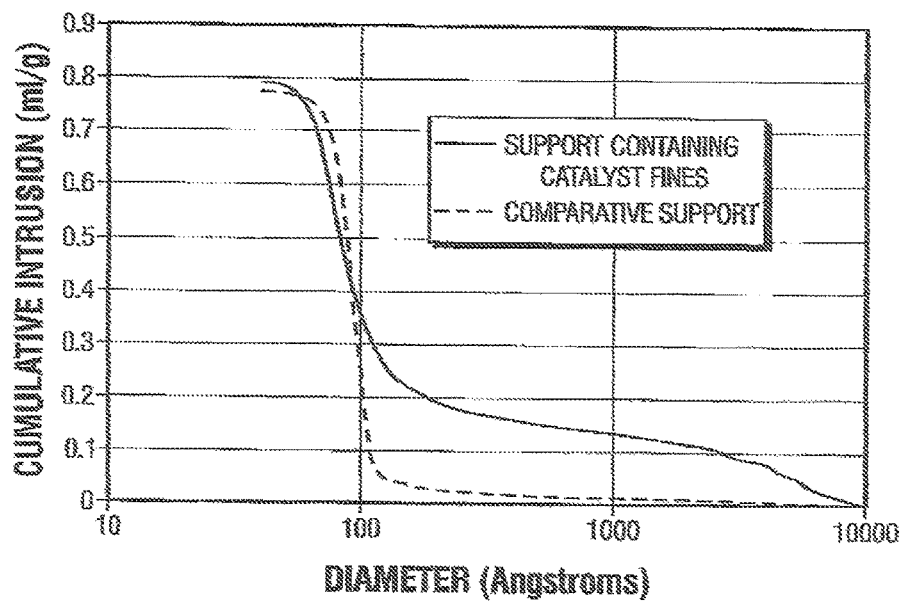

This application is a divisional of U.S. application Ser. No. 14/936,005, filed Nov. 9, 2015 (granted as U.S. Pat. No. 9,724,679 Aug. 8, 2017), which is a divisional of U.S. Non-Provisional application Ser. No. 13/208,148, filed Aug. 11, 2011 (granted as U.S. Pat. No. 9,211,536 Dec. 15, 2015), which claims the benefit of U.S. Provisional Application No. 61/373,472, filed Aug. 13, 2010, the entire disclosures of which are incorporated herein.

The invention relates to a hydroprocessing catalyst that includes a support prepared using catalyst fines, a chelating agent, and a polar additive.

With the increasingly more stringent requirements for reducing the levels of sulfur and nitrogen contained in petroleum derived hydrocarbon product streams there has been an ongoing effort to find new or improved hydroprocessing catalyst formulations and products that may suitably be used to more economically provide for the required sulfur and nitrogen reductions in the hydroprocessing of such petroleum derived hydrocarbon streams.

Typical hydroprocessing catalysts known in the art can include a Group VI metal (Mo and/or W) and a Group VIII (Co and/or Ni) as active components which are supported on an inorganic oxide support material. These catalyst components may be combined and treated in many different ways to give catalyst compositions having certain desired properties.

One example of a hydrotreating catalyst proposed for use in the hydrodesulfurization, hydrodenitrogenation, and hydrodemetallization of various petroleum fractions is disclosed in U.S. Pat. No. 7,235,173. This patent discloses a hydrotreating catalyst containing a group VIB and/or a group VIII with an organic compound as an additive. The organic additive is a compound that contains at least one nitrogen atom and corresponds to a specifically defined generic formula. The catalyst of the '173 patent is prepared by incorporating the hydrogenation metals into a matrix material, such as by ion exchange or dry impregnation of the substrate followed by calcination. The organic compound may be introduced into the catalyst composition by dry impregnation or by co-impregnation simultaneously with the metals or it may be present in the sulfurization feedstock. The '173 patent indicates that its catalysts that employ the particular organic additive exhibit improved activity over the comparative catalysts that do not employ an additive.

In U.S. Publication No. 2009/0298677 is disclosed a hydroprocessing catalyst that includes a carrier containing catalytically active metals from Group VIB and Group VIII of the periodic table and a chelating compound. The chelating agents that are suitable for use in the hydroprocessing catalyst are preferably hydroxycarboxylic acid, especially those that contain one or more carboxyl groups and one or more hydroxyl groups. One preferred chelating agent is citric acid. The hydroprocessing catalyst is prepared by contacting a carrier with an impregnation solution of catalytically active metals and a chelating agent followed by heating the impregnated carrier to a provide a catalyst having a loss on ignition that is within a desired range. The heating temperature is to be less than a temperature that would result in significant or substantial degradation of the organic chelating agent.

The prior art further recognizes the desirability to reuse spent or waste hydroprocessing catalyst in order to solve problems associated with the disposal of or metals reclamation from such catalysts. Disclosed in U.S. Pat. No. 6,127,299 and U.S. Pat. No. 6,030,915 are methods of preparing hydroprocessing catalysts by taking certain so-called waste catalyst, which may include a hydroprocessing catalyst that is either in a spent form or in its unused form, and grinding it into small particles. This ground catalyst is then mixed with either a binder or an additive, or both, and formed or shaped into particles of a new catalyst. One potential problem with the use of ground catalyst fines in the preparation of new catalyst is that they may contribute to a catalyst having a much greater percentage of the pore volume contained in the macropores of the catalyst than if no ground catalyst fines are used. This higher percentage of macropore volume can contribute to a reduced catalyst activity.

As is indicated in the patents summarized above, there is an ongoing need to find new and improved hydroprocessing catalyst compositions having improved catalytic activity and stability when used in the treatment of petroleum derived hydrocarbon process streams having high concentrations of sulfur and nitrogen. Also recognized is the desirability of having a method of making a hydroprocessing catalyst that uses as one of its components ground waste catalyst fines. But, it is noted that the use of ground waste catalyst fines in the preparation and as a component of certain hydroprocessing catalyst compositions can give a final catalyst with certain reduced performance characteristics relative to new catalysts that are prepared without the use of the ground waste catalyst fines. Therefore, it is desirable to have a method of making a new catalyst that uses ground waste catalyst fines but which also provides a final catalyst that exhibits catalytic performance characteristics as good as or better than those characteristics of comparable new catalysts prepared without the use of ground waste catalyst fines.

Accordingly, provided is a hydroprocessing catalyst composition that may be used in the hydroprocessing of hydrocarbon feedstocks to yield a hydrotreated hydrocarbon product. The hydroprocessing catalyst composition comprises a shaped support formed from a mixture comprising an inorganic oxide powder and catalyst fines that are present in an amount in the range upwardly to about 50 wt %; at least one metal component incorporated into the shaped support; a chelating agent; and a polar additive.

Further provided is a method of making a hydroprocessing catalyst composition. This method comprises forming a shaped support comprising an inorganic oxide powder and catalyst fines, wherein the catalyst fines are present in the shaped support in an amount in the range upwardly to about 50 wt % of the shaped support, and wherein the shaped support is dried and calcined; incorporating a metal-containing solution into the shaped support to provide a metal-incorporated support; drying the metal-incorporated support so as to provide a dried metal-incorporated support having a volatiles content in the range of from 1 to 20 wt % LOI; incorporating a polar additive into the dried metal-incorporated support to thereby provide an additive impregnated composition; and incorporating a chelating agent either into the shaped support or into the dried metal-incorporated support.

The catalyst composition of the invention can be used by contacting under hydroprocessing reaction conditions the hydroprocessing catalyst composition with a hydrocarbon feedstock.

FIG. 1 presents a plot of the cumulative pore volume versus pore size of two different catalyst supports, one made using alumina only and the other using metal bearing catalyst fines in addition to alumina.

Figure 2:
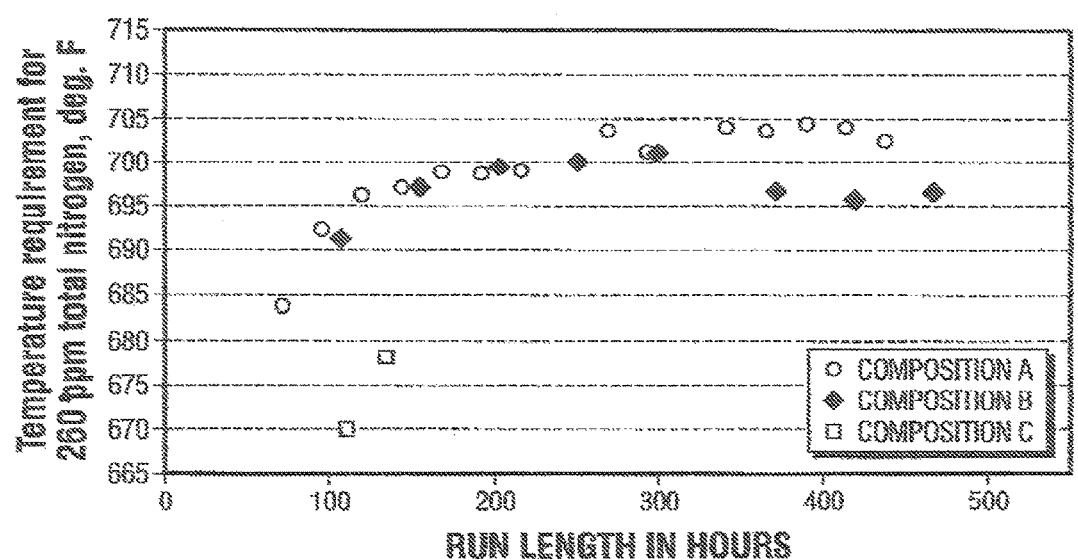

FIG. 2 presents a plot showing the hydrodenitrogenation activity of two embodiments of the inventive catalyst composition relative to a comparative catalyst composition by presenting for each catalyst composition the reaction temperature required to provide for a specified percentage of denitrogenation of a given feedstock as a function of reaction run length.

As noted above, the patent art suggests the desirability to reuse spent or waste hydroprocessing catalyst as a component of newly prepared catalysts. While this is a worthwhile and desirable goal in order to solve certain problems associated with the reclamation of metals from and disposal of spent and waste catalysts, it is recognized that the reuse of spent or waste catalyst as a component of a newly prepared catalyst will provide a fresh catalyst that may not perform as well as one that is made using virgin materials. U.S. Pat. No. 6,030,915 recognizes this problem and presents certain methods of using high temperature calcination in ways to manipulate the mean pore diameter (MPD) of the newly prepared catalyst in order to improve its properties in the hydrotreating of certain heavy hydrocarbon feedstocks. However, the performance characteristics of the new catalyst compositions made with used or waste catalyst without any special treatment tend to have poorer performance characteristics than comparable catalyst compositions prepared with virgin components.

It has been observed that new catalysts prepared using spent or waste catalyst as a component will tend to have a pore structure that includes a higher proportion of its pore volume contained within its macropores, i.e., pores having a diameter greater than 350 Å, than is typically observed with new catalysts prepared with virgin materials. This increase in macropore volume can contribute to a less active catalyst when used in certain applications. But, because of the various benefits derived from the reuse of spent or waste catalyst as a component of a newly prepared catalyst product, it is therefore desired to be able to provide a catalyst composition that is prepared using such spent or waste catalyst as a component but which will have the performance characteristics that approximate or are even better than those of catalysts prepared using virgin materials.

One of the significant features of the invention is in the use of catalyst fines in the preparation of the inventive hydroprocessing catalyst composition. In preparing the inventive hydroprocessing catalyst composition, catalyst fines from spent or reused catalyst are used as a significant component of the newly prepared catalyst. The application of a chelating agent and polar additive in the preparation of the hydroprocessing catalyst composition provide for a final composition having catalytic properties that are as good as or better than those of a hydroprocessing catalyst composition prepared using virgin materials.

The composition of the invention is particularly useful in applications involving the catalytic hydroprocessing of petroleum derived feedstocks, such as in the hydrotreating of atmospheric distillates, gas oils and residues and of vacuum gas oils and residues. One embodiment of the catalyst composition of the invention comprises a shaped support formed from a mixture that comprises an inorganic oxide powder and catalyst fines. The catalyst fines can be present in the mixture in an amount in the range upwardly to about 50 wt % of the mixture or shaped support. The catalyst composition can further comprise at least one metal component that is incorporated into the shaped support and that provides a hydrogenation function, a chelating agent and a polar additive.

The inventive compositions have been found to have exceptional hydrodesulfurization and hydrodenitrogenation activity and to exhibit good catalytic stability when compared to other prior art hydroprocessing catalyst compositions and when compared to compositions made with virgin materials. While it is not known with certainty the actual mechanism that causes or brings about the recognized improvement in catalytic activity of the inventive compositions, it is theorized that a combination of the use of the chelating agent with the polar additive provides for the observed catalytic benefits.

When the chelating agent is used with the metal components of the composition or in the treatment of the shaped support or otherwise contacted with the metals used in the preparation of the composition, it is believed that the chelating agent forms metal chelate complexes with the metals contained in the support and that this reaction results in pulling the metals out or preventing them from being strongly bound to the surface of the support material. It is believed that when the chelant-treated composition is filled with the polar additive the metal chelate complexes are re-dispersed over the surface of the support material. This combined chelation treatment with the use of polar additive is believed to provide for enhanced catalytic performance.

The source of the materials from which the catalyst fines used in the preparation of the inventive catalyst may be from any catalyst that is or may suitably be used in the hydroprocessing, e.g. hydrodesulfurization and hydrodenitrogenation, of petroleum derived hydrocarbon feedstocks. Typical hydroprocessing catalysts that generally include a Group VI hydrogenation metal or a Group VIII hydrogenation metal, or a combination of both, supported on an inorganic oxide carrier or support material may be used as the source of the catalyst fines. Generally, these catalysts can include a Group VI metal in the range of from 10 wt. % to 35 wt. %, preferably, from 17 to 35 wt. %, calculated as the oxide, and a Group VIII metal in the range of from 1 wt. % to 10 wt. %, preferably, from 2 to 6 wt. %, calculated as the oxide. The hydroprocessing catalyst may further include phosphorous, generally present in an amount in the range upwardly to 10 wt. %, calculated as $P_2O_5$. The carrier generally is alumina, which may comprise a minor amount of silica, i.e., up to 20 wt. %.

The catalyst fines are prepared from either a spent hydroprocessing catalyst, preferably which has been regenerated to remove carbon therefrom, or recycled unused hydroprocessing catalyst. What is considered herein to be a spent hydroprocessing catalyst is one that has been used under hydroprocessing conditions to treat a hydrocarbon feedstock. In the use of such a hydroprocessing catalyst, carbon or sulfur, or both, will tend to be deposited upon the catalyst having a deactivation effect.

The spent hydroprocessing catalyst used in the preparation of the catalyst fines of the invention is preferably regenerated by a thermal treatment in order to remove at least a portion of the carbon or sulfur, or both, that is contained thereon. One suitable approach to this thermal treatment is described in U.S. Pat. No. 6,030,915, which patent is incorporated herein by reference. Such a thermal treatment involves heating the spent catalyst in the presence of oxygen or an oxygen containing gas, such as air, to a temperature that promotes the combustion of the carbon or sulfur, or both, deposits. Typically, the regeneration temperature is in the range of from 200° C. to 600° C., and the burning is for a period of from 0.1 to 48 hours or for a time period sufficient to burn a substantial portion of the carbon or sulfur, or both, that is contained on the catalyst to give a regenerated catalyst.

It is a significant aspect of the invention that catalyst fines may be used in the preparation of a hydroprocessing catalyst which can have activity and stability properties that are comparable to those of other hydroprocessing catalyst compositions that do not include the use of a spent or a regenerated or a recycled unused hydroprocessing catalyst as one of its components, but, rather, which uses only virgin materials in its preparation. The catalyst fines used in the invention are prepared from either a spent hydroprocessing catalyst, or a regenerated hydroprocessing catalyst, or a recycled but unused hydroprocessing catalyst.

It is an important feature of the invention for the catalysts fines to be in the form of a finely divided state of reasonably small particles or in a powdered form so as to permit the mixing of the catalyst fines with a porous refractory oxide or other components to provide a mixture that may be shaped or agglomerated or otherwise formed or shaped into a particle that can be used as the shaped support of the invention. This is done by grinding by using any suitable means or method known to those skilled in the art the spent or regenerated or recycled unused hydroprocessing catalyst into small, fine particles that, in general, may have a maximum dimension of less than 0.5 mm (500 microns, μm), i.e., the particles would not be retained on a standard No. 35 US Mesh (0.50 mm).

Suitable means by which the spent or regenerated or recycled unused hydroprocessing catalyst is ground to form fine particles may include any conventional grinding mill used for reducing the size of larger solid materials to smaller particles. Examples of such grinding mills include ball mills, hammer mills, and any other suitable grinding machine known to those skilled in the art. The spent or regenerated or recycled unused hydroprocessing catalyst is ground to smaller particle sizes through attrition and/or compressive forces, preferably, to provide catalyst fines having a mean particle size of less than about 300 μm.

It is preferred for the catalyst fines of the invention to have a mean particle size of less than 150 μm, more preferably, less than 50 μm, and most preferably less 20 μm. When referring herein to the mean particle size of catalyst fines, what is meant is that a representative sample from a batch of catalyst fines contains particles having a size distribution such that 50 vol. % of the particles in such representative sample are of a size above the indicated value and 50 vol. % of the particles in such representative sample are of a size below the indicated value. The reference to the size of the particle means that it will either pass or not pass through a mesh screen of such a dimension.

A practical lower limit for the maximum dimension of the particle size of the catalyst fines is near about 0.2 μm. More typically, the lower limit of the particle size of the catalyst fines is 1 μm and, most typically, the lower size limit is 2 μm. Thus, the maximum dimension of the particle size of the catalyst fines may be in the range of from about 0.2 μm to about 500 μm.

Various possible means and methods that may suitably be used in preparing the catalyst fines of the invention and the catalyst fines themselves are described in the aforementioned U.S. Pat. No. 6,030,915 and in U.S. Pat. No. 6,127,299, which also is incorporated herein by reference.

The shaped support of the invention is prepared by mixing an inorganic oxide powder of porous refractory oxide with the catalyst fines, as described above, to form a mixture. Other components may be added to the mixture to provide the desired mixture properties and characteristics to permit the agglomeration or shaping of the mixture by any of the known means or methods, such as, by extrusion, granulation, beading, tablet pressing, pill making, bracketing, and the like, to provide a shaped support. The formed shaped support may be a shape such as a cylinder, a bead, a ring, and symmetrical and asymmetrical polylobes, such as trilobes or quadrulobes. Cylinders can be preferred.

In a preferred embodiment of the invention, the catalyst fines are mixed with an inorganic oxide powder in proportions such that the amount of the catalyst fines in the resulting mixture is in the range of upwardly to about 50 wt. % of the mixture or of the final shaped support. Also, water, and, if desired or necessary, other chemical aids such as peptizing agents or flocculating agents or binders or other compounds are combined or mixed with the inorganic oxide powder and catalyst fines, to form a mixture or paste that may be formed into an agglomerate or shaped particle. It can be desirable to extrude the resulting mixture to form extrudates of any one or more of various shapes such as cylinders, trilobes, quadrulobes, etc. having nominal sizes such as 1/16 inch, 1/8 inch, 3/16 inch, etc. The agglomerate or shaped particle is then dried and calcined to give the final shaped support particle used in the preparation of the inventive catalyst composition.

It is preferred for the mixture or the shaped support to contain catalyst fines in an amount in the range of from 5 wt. % to 45 wt. %, and, more preferred, the mixture or shaped support can contain from 10 wt. % to 40 wt. % catalyst fines. It is most preferred for the mixture or shaped support to contain from 15 wt. % to 35 wt. % catalyst fines. These weight percents are based on the dry weight of mixture or shaped support.

The amount of porous refractory oxide contained in the mixture or shaped support can be in the range of from about 50 wt. % upwardly to about 100 wt. % of the dry weight of mixture or shaped support. It is preferred, however, for the porous refractory oxide to be present in the mixture or shaped support in an amount in the range of from 55 wt. % to 95 wt. %. More preferred, the porous refractory oxide is present in the mixture or shaped support in an amount in the range of from 60 wt. % to 90 wt. %, and, most preferred, from 65 wt. % to 85 wt. %.

The porous refractory oxide of the inorganic oxide powder used in the preparation of the shaped support may be any material that can suitably provide for the support of the metal hydrogenation components of the hydroprocessing catalyst and which has porosity that may further be filled with the chelating agent solution and polar additive of the invention. Examples of possible suitable porous refractory oxides include silica, alumina, titania, zirconia, silica-alumina, silica-titania, silica-zirconia, titania-alumina, zirconia-alumina, silica-titania and combinations of two or more thereof. The preferred porous refractory oxide for use in the preparation of the support of the inventive composition is one selected from the group consisting of alumina, silica, and silica-alumina. Among these, the most preferred porous refractory oxide is alumina.

The porous refractory oxide generally may have an average pore diameter in the range of from about 50 Angstroms to about 200 Angstroms. The total pore volume of the porous refractory oxide as measured by standard mercury porosimetry methods is in the range of from about 0.2 cc/gram to about 2 cc/grams. The surface area of the porous refractory oxide, as measured by the B.E.T. method, generally exceeds about 100 m$^2$/gram, and it is typically in the range of from about 100 to about 400 m$^2$/gram.

The shaped support particle is dried under standard drying conditions that can include a drying temperature in the range of from 50° C. to 200° C., preferably, from 75° C. to 175° C., and more preferably, from 90° C. to 150° C.

After drying, the shaped support particle is calcined under standard calcination conditions that include a calcination temperature in the range of from 250° C. to 900° C., preferably, from 300° C. to 800° C., and, most preferably, from 350° C. to 600° C.

The shaped support that has been calcined should have a surface area and pore volume that allow for the impregnation of the shaped support with the metal components, chelating agent and polar additive of the invention. The calcined shaped support can have a surface area (determined by the BET method employing $N_2$, ASTM test method D3037) that is in the range of from 50 $m^2/g$ to 450 $m^2/g$, preferably, from 75 $m^2/g$ to 400 $m^2/g$, and, most preferably, from 100 $m^2/g$ to 350 $m^2/g$.

The mean pore diameter in angstroms (Å) of the calcined shaped support is in the range of from 50 to 200, preferably, from 70 to 150, and, most preferably, from 75 to 125.

The pore volume of the calcined shaped support should exceed 0.55 cc/g and is typically in the range of from 0.5 cc/g to 1.1 cc/g. More typically, the pore volume is in the range of from 0.6 cc/g to 1.0 cc/g, and, most typically, it is from 0.7 to 0.9 cc/g.

As mentioned earlier, one of the disadvantages of using catalyst fines, as opposed to using virgin inorganic oxide carrier materials, in the preparation of a shaped support to be used for loading active metals thereon is that the pore structure of the resulting shaped support tends to have a great proportion of its pore volume that is found in macropores. As the term is used herein, a macropore is a pore having a pore diameter of greater than 350 Å. While the fraction of the total pore volume of a shaped support that is contained in macropores can vary depending upon the amount of catalyst fines used in the preparation of the shaped support, in some cases, such fraction can exceed ten percent (10%) of the total pore volume or even exceed 15% or even exceed 20% of the total pore volume. It is best, on the other hand, for the catalyst applications contemplated herein, for the fraction of the total pore volume contained in macropores to be less than 10% or less than 7.5% or less than 5%. One of the benefits of the invention, however, is that the negative impact caused by the presence of relatively large amounts of macropores in the shaped support are offset by the use of and treatment with the chelating agent and polar additive.

The references herein to pore size distribution and pore volume of the calcined shaped particle are to those properties as determined by mercury intrusion porosimetry, ASTM test method D 4284. The measurement of the pore size distribution of the calcined shaped particle is by any suitable measurement instrument using a contact angle of 140° with a mercury surface tension of 474 dyne/cm at 25° C.

In a preferred embodiment of the invention, the shaped support, which preferably has been calcined, is impregnated in one or more impregnation steps with at least one metal component using one or more aqueous solutions containing at least one metal salt wherein the metal compound of the metal salt solution is an active metal or active metal precursor. The metal elements are those selected from Group 6 of the IUPAC Periodic Table of the elements (e.g., chromium (Cr), molybdenum (Mo), and tungsten (W)) and Groups 9 and 10 of the IUPAC Periodic Table of the Elements (e.g., cobalt (Co) and nickel (Ni)). Phosphorous (P) may also be a desired metal component. For the Group 9 and 10 metals, the metal salts include Group 9 or 10 metal acetates, formats, citrates, oxides, hydroxides, carbonates, nitrates, sulfates, and two or more thereof. The preferred metal salts are metal nitrates, for example, such as nitrates of nickel or cobalt, or both. For the Group 6 metals, the metal salts include Group 6 metal oxides or sulfides. Preferred are salts containing the Group 6 metal and ammonium ion, such as ammonium heptamolybdate and ammonium dimolybdate.

The concentration of the metal compounds in the impregnation solution (metal-containing solution) is selected so as to provide the desired metal content in the final composition of the invention taking into consideration the pore volume of the support material into which the aqueous solution is to be impregnated and the amounts of chelating agent and polar additive that are to be incorporated into the support material that is loaded with the metal component. Typically, the concentration of metal compound in the impregnation solution is in the range of from 0.01 to 100 moles per liter.

The metal content of the shaped support having a metal component incorporated therein may depend upon the application for which the final polar additive impregnated composition of the invention is to be used, but, generally, for hydroprocessing applications, the Group 9 and 10 metal component, i.e., cobalt or nickel, preferably, nickel, can be present in the support material having a metal component incorporated therein in an amount in the range of from 0.5 wt. % to 20 wt. %, preferably from 1 wt. % to 15 wt. %, and, most preferably, from 2 wt. % to 12 wt. %.

The Group 6 metal component, i.e., molybdenum or tungsten, preferably, molybdenum, can be incorporated into the shaped support in an amount in the range of from 5 wt. % to 50 wt. %, preferably from 8 wt. % to 40 wt. %, and, most preferably, from 12 wt. % to 30 wt. %.

The above-referenced weight percents for the metal components are based on the weight of the dry shaped support and the metal component as being the element regardless of the actual form, e.g., the oxide form or sulfide form, of the metal component.

In the inventive method of preparing or making the catalyst composition of the invention, the metal-containing impregnation solution may be an aqueous solution comprising at least one metal, as described above, having a hydrogenation function. The at least one metal of the metal-containing impregnation solution may include, for example, a metal selected from the group consisting of nickel, cobalt, molybdenum, tungsten and any combination of two or more thereof, and is incorporated into the shaped support to thereby provide a metal-incorporated support.

The incorporation of the metal-containing impregnation solution into the shaped support may be done by any suitable means or method known to those skilled in the art. Such method may include standard impregnation by incipient wetness or even soaking the shaped support with an excess amount of the metal-containing impregnation solution than would be used in a dry impregnation or an incipient wetness impregnation.

Regardless, however, of the actual means or method used to incorporate the metal-containing impregnation solution into the shaped support, the pores of the resulting metal-incorporated support will be filled with the impregnation solution and, as a result, are unable to retain or be filled with any additional volume of liquid or other material. The metal-incorporated support, thus, undergoes a drying step by which at least a portion of the volatiles content is driven from the metal-incorporated support but leaving the metals behind upon the surface of the support material.

The removal of at least a portion of the volatiles from the metal-incorporated support opens up pore volume which may in a later preparation step be filled with the polar additive and the chelating agent, if the chelating agent has not already been incorporated into the shaped support prior to or concurrently and in combination with the incorporation of the metal-containing solution into the shaped support. The metal-incorporated support, thus, is dried under drying conditions that include a drying temperature that is less than a calcination temperature.

A significant feature of the invention is for the drying temperature under which the step of drying the metal-incorporated support is conducted not to exceed a calcination temperature. Thus, the drying temperature should not exceed 400° C., and, preferably, the drying temperature at which the metal-incorporated support is dried does not exceed 300° C., and, most preferably, the drying temperature does not exceed 250° C. It is understood that this drying step will, in general, be conducted at lower temperatures than the aforementioned temperatures, and, typically, the drying temperature will be conducted at a temperature in the range of from 60° C. to 150° C.

The drying of the metal-incorporated support is preferably controlled in a manner so as to provide the resulting dried metal-incorporated support that has a volatiles content in a particular range. The volatiles content of the dried metal-incorporated support should be controlled so that it does not exceed 20 wt. % LOI. It is preferred for the LOI of the dried metal-incorporated support to be in the range of from 1 wt. % to 20 wt. % LOI, and, most preferred, from 3 wt. % to 15 wt. % LOI.

LOI, or loss on ignition, is defined as the percentage weight loss of the material after its exposure to air at a temperature of 482° C. for a period of two hours. LOI can be represented by the following formula: (sample weight before exposure less sample weight after exposure) multiplied by 100 and divided by (sample weight before exposure).

Through the incorporation or impregnation of the shaped support with the metal-containing solution, the metal components can become strongly bound to the surface of the support material. In order to displace the metal from the surface of the support material, the shaped support or the dried metal-incorporated support can be treated with a chelating agent. One suitable chelation treatment method is described in detail in U.S. Pat. No. 6,291,394, which is incorporated herein by reference. Another suitable chelation treatment methodology is disclosed in U.S. Pat. No. 7,696,120, which is also incorporated herein by reference.

In one embodiment of the inventive method, the chelating agent is incorporated into the shaped support prior to incorporation therein of the metal-containing solution. The remaining pore volume of the shaped support after it is filled with the chelating agent should be such as to allow for further filling of the pore volume with the metal-containing solution to incorporate into the shape support the required or desired amounts of metal components. Alternatively, the shaped support having incorporated therein the chelating agent may be dried in accordance with the procedure described above to remove at least a portion of the chelating agent or the volatile components of the chelating agent solution from the filled pores of the shaped support in order to allow for the subsequent filling of the remaining pore volume with the metal-containing solution.

In an alternative embodiment of the method, the chelating agent may be included with the metal-containing solution that is impregnated into the shaped support. In this approach, the chelating agent is incorporated into the shaped support concurrently or in combination with the impregnation of the metal-containing solution, preferably by dissolving or including the chelating agent in the metal-containing impregnation solution. This is done in such a manner as to assure that the chelating agent is adequately incorporated into the shaped support or metal-incorporated support along with the metal components of the catalyst composition.

In yet another embodiment of the method by which the chelating agent is incorporated into the composition, the dried metal-incorporated support may be contacted, or wetted, with the chelating agent, either prior to the incorporation of the polar additive into the dried metal-incorporated support or concurrently and in combination with the impregnation of the dried metal-incorporated support along with the polar additive.

When the chelating agent is incorporated into the dried metal-incorporated support prior to the incorporation therein of the polar additive there should be sufficient remaining pore volume such as to allow for further filling of the pore volume with the polar additive. Alternatively, the dried metal-incorporated support having incorporated therein the chelating agent may be dried in accordance with the procedure described above to remove at least a portion of the chelating agent or the volatile components of the chelating agent solution from the filled pores of the dried metal-incorporated support in order to allow for the subsequent filling of the pore volume with the polar additive.

The chelating agent may also be included with the polar additive that is impregnated into the dried metal-incorporated support. With this approach, the chelating agent is incorporated into the dried metal-incorporated support concurrently or in combination with the impregnation of the polar additive, preferably by dissolving or including the chelating agent with the polar additive. This is done in such a manner as to assure that the chelating agent is adequately incorporated into the dried metal-incorporated support with the polar additive.

The chelating agent, or chelant, suitable for use in the chelating treatment step of the inventive method includes those compounds that are capable of forming complexes with the metal components, such as any of the Group 6 metals, Group 9 metals and Group 10 metals, as described above, of the composition. As earlier noted, it is particularly important to the inventive method that the chelant have properties that provide for the formation of chelate complexes with the metals of the composition in order to pull the metals from the surface of its support material. The terms chelant, chelating agent, and chelator are used herein to mean the same thing and are considered to be compound that functions as a ligand to form a chelate or chelate complex with a central metal ion.

The chelating agent is added to the shaped support or the metal-incorporated support or dried metal-incorporated support in a liquid form preferably by use of a solution containing the chelating agent which complexes with the metal of the composition. The complexes are, thus, in a liquid phase that provides for the weakening of the bounds between the metal that is present throughout the support material.

Any chelant compound that suitably provides for the formation of metal chelant complexes as required by the inventive method described herein can be used in the chelating treatment. Among these chelant compounds are those chelating agents that contain at least one nitrogen atom that can serve as the electron donor atom for forming the complexes with the metals of the dried metal-incorporated support.

Examples of possible nitrogen atom containing chelating agents include those compounds that can be classified as aminocarboxylic acids, polyamines, aminoalcohols, oximes, and polyethyleneimines.

Examples of aminocarboxylic acids include ethylenediaminetetraacetic acid (EDTA), hydroxyethylenediaminetriacetic acid (HEDTA), diethylenetriaminepentaacetic acid (DTPA), and nitrilotriacetic acid (NTA).

Examples of polyamines include ethylenediamine, diethylenetriamine, triethylenetetramine, and triaminotriethylamine.

Examples of aminoalcohols include triethanolamine (TEA) and N-hydroxyethylethylenediamine.

The preferred chelating agent for use in the inventive method is an aminocarboxylic acid that can be represented by the following formula:

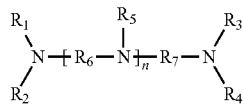

Wherein $R_1$, $R_2$, $R_3$, $R_4$ and $R_5$ are each independently selected from alkyl, alkenyl, and allyl with up to 10 carbon atoms and which may be substituted with one or more groups selected from carbonyl, carboxyl, ester, ether, amino, or amide; wherein R6 and R7 are each independently selected from an alkylene group with up to 10 carbon atoms; wherein n is either 0 or 1; and wherein one or more of the $R_1$, $R_2$, $R_3$, $R_4$ and $R_5$ has the formula:

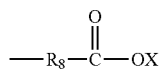

Wherein, $R_8$ is an alkylene having from 1 to 4 carbon atoms; and wherein the X is either hydrogen or another cation.

Preferred chelating agents include ethylenediaminetetraacetic acid (EDTA), hydroxyethylenediaminetriacetic acid (HEDTA), and diethylenetriaminepentaacetic acid (DTPA). The most preferred chelating agent is DTPA.

Any suitable means or method can be used to contact the shaped support or metal-incorporated support or dried metal-incorporated support with the chelating agent or solution having a concentration of chelating agent; provided, such means or method provides for the suitable incorporation or impregnation of the chelating agent within the pores of the support material. Examples of suitable methods of applying the chelating agent or chelating solution to the shaped support or metal-incorporated support or dried metal-incorporated support can include dipping or spraying.

A preferred method for contacting the shaped support or metal-incorporated support or dried metal-incorporated support with the chelating agent or chelating solution is by any suitable impregnation method known to those skilled in the art, for instance, impregnation by incipient wetness whereby the amount or volume of chelating solution added to the shaped support or metal-incorporated support or dried metal-incorporated support is such that the total volume of the added chelating solution is in an amount that may range upwardly to about the available pore volume of the shaped support or metal-incorporated support or dried metal-incorporated support to be impregnated with the chelating solution.

The chelating solution can be a solution comprising the chelating agent and a solvent that suitably provides for the dissolution of the chelating agent. Possible solvents include water and alcohols, such as, methanol and ethanol, with water being the preferred solvent for the chelating agent.

The amount of chelating agent that is applied to the shaped support or metal-incorporated support or dried metal-incorporated support should be such as to provide for the desired level of metal chelate complex formation as described herein; and, generally, the amount is such as to incorporate into the shaped support or metal-incorporated support or dried metal-incorporated support chelating agent in an amount in the range of from about 0.005 moles chelant to about 1 mole chelant per mole of active metal, i.e., Group 6, Group 9 and Group 10 metals described above, that is in the shaped support or metal-incorporated support or the dried metal-incorporated support.

It is more preferred to add to the shaped support or metal-incorporated support or dried metal-incorporated support an amount of chelating agent that is in the range of from 0.01 to 0.5 moles of added chelating agent per mole of hydrogenation metal. Most preferred, the amount of chelating agent added to the shaped support or metal-incorporated support or dried metal-incorporated support is in the range of from 0.05 to 0.1 moles of added chelant per mole of hydrogenation metal.

In a preferred method of making the composition of the invention, the metal-incorporated support is dried followed by the incorporation therein of the chelating agent. This treatment of the dried metal-incorporated support with the chelating agent provides for the presence of metal chelate complexes that should be redispersed over the surface of the support material and converted into a form of active metal precursors. This chelant treated metal-incorporated support is dried to remove at least a portion of the solvent in order to provide a dried chelant treated metal-incorporated support in which the polar additive may be incorporated.

The drying of the chelant treated metal-incorporated support is to remove at least a portion of the solvent of the chelating solution from the chelant treated metal-incorporated support while leaving at least a portion, preferably a major portion of the chelating agent on the chelant treated metal-incorporated support. In a preferred embodiment of the invention, it is important for the dried chelant treated metal-incorporated support to include therein an amount or a concentration of chelant when a polar additive is subsequently incorporated into the dried chelant treated metal-incorporated support.

In the drying of the chelant treated metal-incorporated support it is desirable to remove as little of the chelant therefrom as is practical and, thus, more than about 50 weight percent of the chelant that is incorporated into the chelant treated metal-incorporated support, based on the total weight of chelant incorporated into the chelant treated metal-incorporated support, will remain in the resulting dried chelant treated metal-incorporated support. Preferably, the amount of chelant remaining on the dried chelant treated metal-incorporated support exceeds 75 weight percent, and, most preferably, more than 90 weight percent of the chelant originally added to the dried metal-incorporated support remains in the dried chelant treated metal-incorporated support when the polar additive is subsequently added. Thus, less than about 50 weight percent of the chelant originally added to the dried metal-incorporated support in the chelation treatment thereof should be removed from the chelant treated metal-incorporated support during the drying step. Preferably, less than 25 weight percent and, most preferably, less than 10 weight percent, of the chelant incorporated into the dried metal-incorporated support is removed from the chelant treated metal-incorporated support.

The volatiles content of the dried chelant treated metal-incorporated support should be controlled so that it does not exceed 20 wt. % LOI. LOI is defined above. It is preferred for the LOI of the dried chelant treated metal-incorporated support to be in the range of from 1 wt. % to 20 wt. % LOI, and, most preferred, from 3 wt. % to 15 wt. % LOI.

The drying can be conducted by any suitable method known to those skilled in the art. Typically, to dry the chelant treated metal-incorporated support, hot air or any other suitable gas, such as nitrogen and carbon dioxide, is passed over the chelant treated metal-incorporated support. The drying temperature should not exceed 200° C., and, can generally be in the range of from 90° C. to 180° C. Preferably, the drying temperature is less than 175° C. and can range from 100° C. to 175° C. The drying step is carefully controlled in order to avoid either evaporating or converting the chelant or chelates.

The available pore volume of the pores of the dried chelant treated metal-incorporated support provided by drying of the chelant treated metal-incorporated support may be filled with the polar additive of the invention. This is done by incorporating the polar additive into the dried chelant treated metal-incorporated support to provide an additive impregnated composition by using any suitable method or means to impregnate the dried chelant treated metal-incorporated support with the polar additive.

The preferred method of impregnation of the dried chelant treated metal-incorporated support with the polar additive may be any standard well-known pore fill methodology whereby the pore volume is filled by taking advantage of capillary action to draw the liquid into the pores of the dried chelant treated metal-incorporated support. It is desirable to fill at least 75% of the available pore volume of the dried chelant treated metal-incorporated support with the polar additive, and, preferably, at least 80% of the available pore volume of the dried chelant treated metal-incorporated support is filled with the polar additive. Most preferably, at least 90% of the available pore volume of the dried chelant treated metal-incorporated support is filled with the polar additive.

In addition to the dispersing of metal complexes by the polar additive, it is also thought that the presence of the polar additive in the additive impregnated composition, when it is placed in catalytic service or when it undergoes an activation in order to use the composition in catalytic service, provides certain benefits that help give a much more active catalyst than those of the prior art.

The polar additive that may be used in the preparation of the inventive composition can be any suitable molecule that provides for the benefits and has the characteristic molecular polarity or molecular dipole moment and other properties, if applicable, as are described herein, and as are disclosed in co-pending patent application U.S. application Ser. No. 12/407,479, filed Mar. 19, 2009, (U. S. Publication No. US20100236988), which is incorporated herein by reference. Molecular polarity is understood in the art to be a result of non-uniform distribution of positive and negative charges of the atoms that make up a molecule. The dipole moment of a molecule may be approximated as the vector sum of the individual bond dipole moments, and it can be a calculated value.

One method of obtaining a calculated value for the dipole moment of a molecule, in general, includes determining by calculation the total electron density of the lowest energy conformation of the molecule by applying and using gradient corrected density functional theory. From the total electron density the corresponding electrostatic potential is derived and point charges are fitted to the corresponding nuclei. With the atomic positions and electrostatic point charges known, the molecular dipole moment can be calculated from a summation of the individual atomic moments.

As the term is used in this description and in the claims, the "dipole moment" of a given molecule is that as determined by calculation using the publicly available, under license, computer software program named Materials Studio, Revision 4.3.1, copyright 2008, Accerlys Software Inc.

Following below is a brief discussion of some of the technical principles behind the computation method and application of the Materials Studio computer software program for calculating molecular dipole moments.

The first step in the determination of the calculated value of the dipole moment of a molecule using the Materials Studio software involves constructing a molecular representation of the compound using the sketching tools within the visualizer module of Materials Studio. This sketching process involves adding atoms to the sketcher window that constitute the compound and completing the bonds between these atoms to fulfill the recognized bonding connectivity that constitute the compound. Using the clean icon within the Material Studio program automatically orients the constructed compound into the correct orientation. For complex compounds, a conformational search is performed to ensure that the orientation used to calculate the molecular dipole is the lowest energy conformation, i.e., its natural state.

The Quantum Mechanical Code DMol3 (Delley, B. *J. Chem. Phys.*, 92, 508 (1990)) is utilized to calculate the molecular dipole moments from first principles by applying density functional theory. "Density Functional Theory Begins with a Theorem", by Hohenberg and Kohn (Hohenberg, P.; Kohn, W. "Inhomogeneous Electron Gas", *Phys. Rev. B*, 136, 864-871 (1964); Levy, M. "Universal Variational Functionals of Electron Densities, First-Order Density Matrices, and Natural Spin-Orbitals and Solution of the V-Representability Problem", *Proc. Natl. Acad. Sci. U.S.A.*, 76, 6062-6065 (1979)), which states that all ground-state properties are functions of the charge density $\rho$. Specifically, the total energy $E_t$ may be written as:

$$E_t[\rho] = T[\rho] + U[\rho] + E_{xc}[\rho] \qquad \text{Eq.1}$$

where $T[\rho]$ is the kinetic energy of a system of noninteracting particles of density $\rho$, $U[\rho]$ is the classical electrostatic energy due to Coulombic interactions, and $E_{xc}[\rho]$ includes all many-body contributions to the total energy, in particular the exchange and correlation energies.

As in other molecular orbital methods (Roothaan, C. C. J. "New Developments in Molecular Orbital Theory", *Rev. Mod. Phys.*, 23, 69-89 (1951); Slater, J. C., "Statistical Exchange-Correlation in the Self-Consistent Field", *Adv. Quantum Chem.*, 6, 1-92 (1972); Dewar, M. J. S. *J. Mol. Struct.*, 100, 41 (1983)), the wave function is taken to be an antisymmetrized product (Slater determinant) of one-particle functions, that is, molecular orbitals:

$$\Psi = A(n) | \phi_1(1) \phi_2(2) \ldots \phi_n(n) | \qquad \text{Eq.2}$$

The molecular orbitals also must be orthonormal:

$$\langle \phi_i | \phi_j \rangle = \delta_{ij} \qquad \text{Eq. 3}$$

The charge density summed over all molecular orbitals is given by the simple sum:

$$\rho(r) = \sum_i |\phi_i(r)|^2 \qquad \text{Eq. 4}$$

where the sum goes over all occupied molecular orbitals $\phi_i$. The density obtained from this expression is also known as the charge density. From the wave functions and the charge density the energy components from Eq. 1 can be written (in atomic units) as:

$$T = \left\langle \sum_i^n \phi_i \left| \frac{-\nabla^2}{2} \right| \phi_i \right\rangle \qquad \text{Eq. 5}$$

In Eq. 6, $Z\alpha$ refers to the charge on nucleus $\alpha$ of an N-atom system. Further, in Eq. 6, the term $\rho(r_1)V_N$, represents the electron-nucleus attraction, the term $\rho(r_1)V_e(r_1)/2$, represents the electron-electron repulsion, and the term, $V_{NN}$, represents the nucleus-nucleus repulsion.

$$U = \sum_i^n \sum_\alpha^N \left\langle \phi_i(r) \left| \frac{-Z}{R_\alpha - r} \right| \phi_i(r) \right\rangle + \qquad \text{Eq. 6}$$

$$\frac{1}{2} \sum_i \sum_j \left\langle \phi_i(r_1)\phi_j(r_2) \frac{1}{r_1 - r_2} \phi_i(r_1)\phi_j(r_2) \right\rangle +$$

$$\sum_\alpha^N \sum_{\beta < \alpha} \frac{Z_\alpha Z_\beta}{|R_\alpha - R_\beta|}$$

$$= -\sum_\alpha^N \left\langle \rho(r_1) \frac{Z_\alpha}{|R_\alpha - r_1|} \right\rangle + \frac{1}{2} \left\langle \rho(r_1)\rho(r_2) \frac{1}{|r_1 - r_2|} \right\rangle +$$

$$\sum_\alpha^N \sum_{\beta < \alpha} \frac{Z_\alpha Z_\beta}{|R_\alpha - R_\beta|}$$

$$\equiv \langle -\rho(r_1)V_N \rangle + \left\langle \rho(r_1) \frac{V_e(r_1)}{2} \right\rangle + V_{NN}$$

The term, $E_{xc}[\rho]$ in Eq. 1, the exchange-correlation energy, requires some approximation for this method to be computationally tractable. A simple and surprisingly good approximation is the local density approximation, which is based on the known exchange-correlation energy of the uniform electron gas. (Hedin, L.; Lundqvist, B. I. "Explicit Local Exchange Correlation Potentials", *J. Phys. C*, 4, 2064-2083 (1971); Ceperley, D. M.; Alder, B. J. "Ground State of the Electron Gas by a Stochastic Method", *Phys. Rev. Lett.*, 45, 566-569 (1980)). The local density approximation assumes that the charge density varies slowly on an atomic scale (i.e., each region of a molecule actually looks like a uniform electron gas). The total exchange-correlation energy can be obtained by integrating the uniform electron gas result:

$$\varepsilon_{xc}[\rho] \cong \int \rho(r)\varepsilon_{xc}[\rho(r)]dr \qquad \text{Eq. 7}$$

where $E_{xc}[\rho]$ is the exchange-correlation energy per particle in a uniform electron gas and $\rho$ is the number of particles. In this work the gradient corrected exchange-correlation functional PW91 is used (Perdew, J. P.; Wang, Y. *Phys. Rev. B*, 45, 13244 (1992)).

With all the components derived to describe the total energy of any molecular system within the density functional formalism, the dipole moment can be calculated from a summation of the individual electronic and nuclear dipole moment vectors which are displayed at the end of the DMol3 output file.

References herein to the polar additive are understood to mean a molecule that has polarity and having a dipole moment, as calculated by the aforementioned Materials Studio software or other known method that will provide substantially the same calculated value for the dipole moment of a molecule as the Materials Studio software will provide, which exceeds the dipole moment of the hydrocarbon oil that is used in the inventive composition.

The dipole moment of the polar additive should be at least or exceed 0.45. However, it is preferred for the polar additive to have a characteristic dipole moment that is at least or exceeds 0.5, and, more preferred, the dipole moment of the polar additive should be at least or exceed 0.6. A typical upper limit to the dipole moment of the polar additive is up to about 5, and, thus, the dipole moment of the polar additive may be, for example, in the range of from 0.45 to 5. It is preferred for the dipole moment of the polar additive to be in the range of from 0.5 to 4.5, and, more preferred, the dipole moment is to be in the range of from 0.6 to 4.

As alluded to above, it is theorized that the polarity of the polar additive is significant to the invention; because, the polarity is required for the interaction with the surface of the support material and active metal components of the support material of the inventive composition. It is by these interactions that physical and chemical bonds with the active phases of the inventive composition are formed.

A particularly desirable attribute of the polar additive is for it to be a heterocompound. A heterocompound is considered herein to be a molecule that includes atoms in addition to carbon and hydrogen. These additional atoms can include, for example, nitrogen or oxygen, or both. It is desirable for the group of heterocompounds to exclude those heterocompounds that include sulfur, and, in all cases, the polar additive does not include paraffin and olefin compounds, i.e. compounds that contain only carbon and hydrogen atoms. Considering the exclusion of sulfur-containing compounds from the definition of the group of heterocompounds, it can further be desirable for the oil and additive impregnated composition, before its treatment with hydrogen and sulfur, to exclude the material presence of a sulfur-containing compound.

Specific polar compounds that may be suitable for use as the polar additive of the invention are presented in the following Table 1, which also includes their calculated dipole moments.

TABLE 1

Polar Compounds and Their Calculated Dipole Moments

| Compound | Formula | Class | Boiling Point (° C.) | Calc. Dipole Moment |
|---|---|---|---|---|
| 2,4-pentanedione | $C_5H_8O_2$ | Diketone | 140 | 1.59 |
| Triethylphosphate | $C_6H_{15}O_4P$ | Phosphate | 215-216 | 3.25 |
| Triethylphosphite | $C_6H_{15}O_3P$ | Phosphite | 156 | 0.64 |
| 1-pentanol | $C_5H_{12}O$ | Alcohol | 138 | 1.85 |
| Guanidine | $CH_5N_3$ | Imine | n/a | 3.8 |
| Alanine | $C_3H_7NO_2$ | Amino acid | n/a | 2.16 |

TABLE 1-continued

Polar Compounds and Their Calculated Dipole Moments

| Compound | Formula | Class | Boiling Point (° C.) | Calc. Dipole Moment |
|---|---|---|---|---|
| Glycine | $C_2H_5NO_2$ | Amino acid | n/a | 5.81 |
| Ethylenediamine | $C_2H_8N_2$ | Diamine | 116 | 2.46 |
| Monoethanolamine | $C_2H_7NO$ | Alcohol-amine | 170 | 3.42 |
| Tetramethylurea | $C_5H_{12}N_2O$ | Diamine | 174-178 | 3.44 |
| Acetonitrile | $C_2H_3N$ | Nitrile | 82 | 3.87 |
| n-methylpyrrolidone | $C_5H_9NO$ | Cyclic-amide | 202 | 3.92 |
| glucose | $C_6H_{12}O_6$ | sugar | n/a | 4.38 |
| Sucrose | $C_{12}H_{22}O_{11}$ | sugar | n/a | 7.45 |
| Octylamine | $C_8H_{19}N$ | Amine | 175-176 | 1.36 |
| Phenylboromic acid | $C_6H_7BO_2$ | Boric acid | n/a | 5.86 |
| n-ethylcarbazole | $C_{14}H_{13}N$ | Carbazole | n/a | 1.93 |
| Acetophenone | $C_8H_8O$ | ketone | 202 | 3.15 |
| Diethyleneglycol | $C_4H_{10}O_3$ | Alcohol | 244-245 | 2.76 |
| Dibenzofuran | $C_{12}H_8O$ | Oxygen heterocycle | 285 | 0.78 |
| Dimethylformamide | $C_3H_7NO$ | Amide | 153 | 4.02 |
| Citric acid | $C_6H_8O_7$ | Carboxylic acid | 175 | 3.37 |
| Ethylenediamine-tetraacetic acid | $C_{10}H_{16}N_2O_8$ | Polyamino carboxylic acid | n/a | 3.99 |
| Nitrilotriacetic acid | $C_6H_9NO_6$ | Polyamino carboxylic acid | n/a | 1.58 |

A preferred characteristic of the polar additive is for its boiling temperature to be in the range of from 50° C. to 275° C. More preferably, the boiling temperature of the polar additive is to be in the range of from 60° C. to 250° C., and, most preferably, it is in the range of from 80° C. to 225° C.

The most desirable compounds for use as the polar additive of the invention are those selected from the group of amide compounds, which includes dimethylformamide.

The additive impregnated composition of the invention may be treated, either ex situ or in situ, with hydrogen and with a sulfur compound, and, indeed, it is one of the beneficial features of the invention that it permits the shipping and delivery of a non-sulfurized composition to a reactor in which it can be activated, in situ, by a hydrogen treatment step followed by a sulfurization step. In the activation of the additive impregnated composition it first can undergo a hydrogen treatment that is then followed with treatment with a sulfur compound.

The hydrogen treatment includes exposing the additive impregnated composition to a gaseous atmosphere containing hydrogen at a temperature ranging upwardly to 250° C. Preferably, the additive impregnated composition is exposed to the hydrogen gas at a hydrogen treatment temperature in the range of from 100° C. to 225° C., and, most preferably, the hydrogen treatment temperature is in the range of from 125° C. to 200° C.

The partial pressure of the hydrogen of the gaseous atmosphere used in the hydrogen treatment step generally can be in the range of from 1 bar to 70 bar, preferably, from 1.5 bar to 55 bar, and, most preferably, from 2 bar to 35 bar. The additive impregnated composition is contacted with the gaseous atmosphere at the aforementioned temperature and pressure conditions for a hydrogen treatment time period in the range of from 0.1 hours to 100 hours, and, preferably, the hydrogen treatment time period is from 1 hour to 50 hours, and most preferably, from 2 hours to 30 hours.

Sulfiding of the additive impregnated composition after it has been treated with hydrogen can be done using any conventional method known to those skilled in the art. Thus, the hydrogen treated additive impregnated composition can be contacted with a sulfur-containing compound, which can be hydrogen sulfide or a compound that is decomposable into hydrogen sulfide, under the contacting conditions of the invention. Examples of such decomposable compounds include mercaptans, $CS_2$, thiophenes, dimethyl sulfide (DMS), and dimethyl disulfide (DMDS). Also, preferably, the sulfiding is accomplished by contacting the hydrogen treated composition, under suitable sulfurization treatment conditions, with a hydrocarbon feedstock that contains a concentration of a sulfur compound. The sulfur compound of the hydrocarbon feedstock can be an organic sulfur compound, particularly, one which is typically contained in petroleum distillates that are processed by hydrodesulfurization methods.

Suitable sulfurization treatment conditions are those which provide for the conversion of the active metal components of the hydrogen treated hydrocarbon oil and polar additive impregnated composition to their sulfided form. Typically, the sulfiding temperature at which the hydrogen treated hydrocarbon oil and polar additive impregnated composition is contacted with the sulfur compound is in the range of from 150° C. to 450° C., preferably, from 175° C. to 425° C., and, most preferably, from 200° C. to 400° C.

When using a hydrocarbon feedstock that is to be hydrotreated using the catalyst composition of the invention to sulfide the hydrogen treated composition, the sulfurization conditions can be the same as the process conditions under which the hydrotreating is performed. The sulfiding pressure at which the hydrogen treated additive impregnated composition is sulfided generally can be in the range of from 1 bar to 70 bar, preferably, from 1.5 bar to 55 bar, and, most preferably, from 2 bar to 35 bar.

One of the benefits provided by the additive impregnated composition of the invention is that it can be utilized in a reactor system that is started up using a so-called delayed feed introduction procedure. In the delayed feed introduction procedure, the reactor system, which includes a reactor vessel containing the additive impregnated composition, first undergoes a heating step to raise the temperature of the reactor and the additive impregnated composition contained therein in preparation for the introduction of a sulfiding agent or heated hydrocarbon feedstock for processing. This heating step includes introducing into the reactor the hydrogen-containing gas at the aforementioned hydrogen treatment conditions. After the hydrogen treatment of the additive impregnated composition, it is thereafter treated with a sulfur compound in the manner as earlier described herein.

It has been found that the additive impregnated composition, after undergoing the hydrogen treatment followed by treatment with a sulfur compound, exhibits a greater catalytic hydrotreating activity of a distillate feedstock than do other similar, but non-impregnated compositions.

It is recognized that the additive impregnated composition of the invention, after its treatment with hydrogen and sulfur, is a highly effective catalyst for use in the hydrotreating of hydrocarbon feedstocks. This catalyst is particularly useful in applications involving the hydrodesulfurization or hydrodenitrogenation of hydrocarbon feedstocks, and, especially, it has been found to be an excellent catalyst for use in the hydrodesulfurization of distillate feedstocks, in particular, diesel, to make an ultra-low sulfur distillate product having a sulfur concentration of less than 15 ppmw, preferably, less than 10 ppmw, and, most preferably, less than 8 ppmw.

In the hydrotreating applications, the additive impregnated composition, preferably used in a delayed feed introduction procedure or otherwise treated with hydrogen and sulfur, as described above, is contacted under suitable hydrodesulfurization conditions with a hydrocarbon feedstock that typically has a concentration of sulfur. The more typical and preferred hydrocarbon feedstock is a petroleum middle distillate cut having a boiling temperature at atmospheric pressure in the range of from 140° C. to 410° C. These temperatures are approximate initial and boiling temperatures of the middle distillate. Examples of refinery streams intended to be included within the meaning of middle distillate include straight run distillate fuels boiling in the referenced boiling range, such as, kerosene, jet fuel, light diesel oil, heating oil, heavy diesel oil, and the cracked distillates, such as FCC cycle oil, coker gas oil, and hydrocracker distillates. The preferred feedstock of the inventive distillate hydrodesulfurization process is a middle distillate boiling in the diesel boiling range of from about 140° C. to 400° C.

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds. Typically, however, the distillate feedstock of the inventive process has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw). It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

The additive impregnated composition of the invention may be employed as a part of any suitable reactor system that provides for contacting it or its derivatives with the distillate feedstock under suitable hydrodesulfurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The hydrodesulfurization process generally operates at a hydrodesulfurization reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydrodesulfurization reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.). It is recognized that one of the unexpected features of the use of the inventive additive impregnated composition of the invention is that it has a significantly higher catalytic activity than certain other alternative catalyst compositions, and, thus, it will, in general, provide for comparatively lower required process temperatures for a given amount of hydtrotreatment of a feedstock.

The flow rate at which the distillate feedstock is charged to the reaction zone of the inventive process is generally such as to provide a liquid hourly space velocity (LHSV) in the range of from 0.01 hr$^{-1}$ to 10 hr$^{-1}$. The term "liquid hourly space velocity", as used herein, means the numerical ratio of the rate at which the distillate feedstock is charged to the reaction zone of the inventive process in volume per hour divided by the volume of catalyst contained in the reaction zone to which the distillate feedstock is charged. The preferred LHSV is in the range of from 0.05 hr$^{-1}$ to 5 hr$^{-1}$, more preferably, from 0.1 hr$^{-1}$ to 3 hr$^{-1}$. and, most preferably, from 0.2 hr$^{-1}$ to 2 hr$^{-1}$.

It is preferred to charge hydrogen along with the distillate feedstock to the reaction zone of the inventive process. In this instance, the hydrogen is sometimes referred to as hydrogen treat gas. The hydrogen treat gas rate is the amount of hydrogen relative to the amount of distillate feedstock charged to the reaction zone and generally is in the range upwardly to 1781 m$^3$/m$^3$ (10,000 SCF/bbl). It is preferred for the treat gas rate to be in the range of from 89 m$^3$/m$^3$ (500 SCF/bbl) to 1781 m$^3$/m$^3$ (10,000 SCF/bbl), more preferably, from 178 m$^3$/m$^3$ (1,000 SCF/bbl) to 1602 m$^3$/m$^3$ (9,000 SCF/bbl), and, most preferably, from 356 m$^3$/m$^3$ (2,000 SCF/bbl) to 1425 m$^3$/m$^3$ (8,000 SCF/bbl).

The desulfurized distillate product yielded from the process of the invention has a low or reduced sulfur concentration relative to the distillate feedstock. A particularly advantageous aspect of the inventive process is that it is capable of providing a deeply desulfurized diesel product or an ultra-low sulfur diesel product. As already noted herein, the low sulfur distillate product can have a sulfur concentration that is less than 50 ppmw or any of the other noted sulfur concentrations as described elsewhere herein (e.g., less than 15 ppmw, or less than 10 ppmw, or less than 8 ppmw).

The following examples are presented to further illustrate certain aspects of the invention, but they are not to be construed as limiting the scope of the invention.

EXAMPLE 1

This Example describes the preparation of a comparative support made from powdered alumina without the addition of catalyst fines and the preparation of a support made using metal bearing catalyst fines in addition to powdered alumina. The support containing catalyst fines was used in the preparation of the inventive catalyst composition of Example 3. This Example further presents selected physical property data for each supports.

The comparative support was made by mixing alumina, water and nitric acid to form a mixture that was extruded into 1.3 mm Trilobe extrudates. The shaped support extrudates were dried and calcined using standard drying and calcination techniques so as to provide an alumina carrier for loading the active metals and additive components of the compositions. The properties of the shaped alumina support are presented in Table 2 below.

TABLE 2

| Properties of Shaped Support without incorporation of metal bearing fines | |
|---|---|
| Property | Value |
| Shape | 1.3 mm Trilobe |
| N2 Surface area (m2/g) | 300 |

TABLE 2-continued

Properties of Shaped Support without incorporation of metal bearing fines

| Property | Value |
|---|---|
| Mean pore diameter by vol. (Ang.) | 91 |
| Pore volume greater than 350 Ang. (%) | <5 |
| Water pore volume (cc/g) | 0.88 |

The support containing catalyst fines was made in a similar manner by mixing alumina powder, metal bearing catalyst fines, water and nitric acid to form a mixture that was extruded into 1.3 mm Trilobe extrudate. The amount of fines taken for the preparation was chosen to be 30% by weight of alumina from the fines, 70% of total alumina content by weight being from the fresh alumina powder.

TABLE 3

Properties of Shaped Support with incorporation of 30% regenerated catalyst fines

| Property | Value |
|---|---|
| Shape | 1.3 mm Trilobe |
| N2 Surface area (m2/g) | 320 |
| Mean pore diameter by vol. (Ang.) | 89 |
| Pore volume greater than 350 Ang. (%) | 20.2 |
| Water pore volume (cc/g) | 0.883 |
| Ni, wt % | 0.8 |
| Mo, wt % | 4.0 |
| P, wt % | 0.8 |

The cumulative pore size distribution for each of the two supports was measured by mercury porosimetry with the results presented in FIG. 1.

As may be observed in the plots of FIG. 1, the comparative support has a pore structure such that less than 5% of its total pore volume is contained in the macropores (i.e., pores having a pore diameter greater than 350 angstroms) of the support, but, on the other hand, the support containing the catalyst fines has a pore structure such that at least 20% of its total pore volume is contained in the macropores. This demonstrates the effect that the use of catalyst fines in the preparation of a support has on the final pore structure of the support. As mentioned earlier herein, an increased amount of macropores in a catalyst can, for certain applications, cause loss in catalytic activity.

EXAMPLE 2

This Example describes the preparation of comparative Composition A using the comparative support described in Example 1 with properties outlined in Table 2.

200 grams of the dry support was taken for the impregnation with the following described impregnation solution. The impregnation solution was prepared as follows: 59.07 g $(NH_4)_2Mo_2O_7$, 16.57 g $MoO_3$ and 47.83 ml DI $H_2O$ were combined in a glass beaker with stirring at ambient temperature. 2.85 g MEA (monoethanolamine) were added to the mixture below surface to control exotherm. The mixture was heated to 140 F to dissolve solids, and cooled down to ambient at pH=5.29 to provide the Solution 1.

Separately, 30.59 g of nickel nitrate $Ni(NO_3)_2 \times 6H_2O$ were combined with 8.86 g of nickel carbonate $NiCO_3$ in 29.2 ml DI $H_2O$. 23.83 g of phosphoric acid $H_3PO_4$ (85.9%) was slowly added to control foaming. After forming a clear Solution 2 at ambient temperature the pH was 0.19.

Solution 2 was then added to Solution 1 with stirring. The resulting mixture was topped with DI $H_2O$ to give a total solution volume of 176 ml which equals to the total water pore volume of 200 g support taken for the synthesis. The pH of the final solution prior to impregnation was 2.82.

The impregnation solution was added at once to the support, and the impregnates were aged with occasional shaking for a few hours.

The impregnates were dried at 212° F. (100° C.) for 4 hours and finally calcined at 900° F. (482° C.) for 2 hours to yield comparative Composition A with the following target metals contents: 15.0% Mo, 3.5% Ni, 2.2% P (dry basis).

EXAMPLE 3

This Example describes the preparation of Composition B, which is one embodiment of the inventive composition, using the support containing 30% regenerated catalyst fines of Example 1 that is impregnated with hydrogenation metal components and a chelating agent and then dried and filled with a polar additive.

Composition B was impregnated with a solution comprising the chelating agent diethylenetriaminepentaacetic acid (DTPA) and metals. This solution was prepared as follows: 56.44 g $MoO_3$ (66.5% Mo), 22.73 g $NiCO_3$ (42.73% Ni) and 67 ml DI $H_2O$ were combined in a glass beaker with stirring at ambient temperature. The mixture was heated to about 195° F. (91° C.) with steering until a clear solution was obtained. The solution was allowed to cool down to about 140° F. (60° C.) at which time 12.72 g diethylenetriaminepentaacetic acid (DTPA, 99% concentration, BASF, Trilon C Powder) were added. After cooling the solution to ambient temperature, and it was topped DI water to a volume to 143.1 ml. A final clear solution was obtained.

The impregnation solution was added at once to 160.15 g of the support, containing catalyst fines (Example 1, Table 2). The impregnates were aged with occasional shaking for a few hours, and then dried in air at 300° F. (149° C.) for 3 hours (but not calcined) in order to eliminate excess moisture and reduce the volatiles content thereof to a target LOI and to free up pore volume that could subsequently be filled with a polar additive. Catalyst intermediate of the Composition B was thus obtained. Metals contents added from the impregnation solution (dry "fresh metals" basis) were 15.36% Mo and 3.98% Ni as well as 2.76% P.

The dried catalyst intermediate was then filled by pore volume impregnation with the polar additive dimethylformamide (DMF) to at least a 90% pore volume fill to give the inventive Composition B (additive impregnated composition).

EXAMPLE 4

The example describes inventive Composition C that was obtained by pore volume impregnation of the intermediate Composition B (described in Example 3) with a blend of polar additives comprising 50% mixture by volume DMF and 50% hexadecylamine.

EXAMPLE 5

This Example describes the procedure for testing the catalytic performance of the compositions of Examples 2-4, and it presents the performance results from their use in the hydrotreating of a vacuum gas oil feedstock (activity testing).

Trickle flow micro-reactors were used to test the hydrodesulfurization (HDS) and hydrodenitrogenation (HDN) activities of the catalyst Compositions A, B, and C.

A 50 cc volume, based on compacted bulk density of whole pellets, of each composition was used in the testing. The reactors were packed with extrudates of each composition, which were diluted with 80-60 mesh SiC in the volumetric composition-to-diluent ratio of 1:1. The compositions were conditioned and sulfided using a delayed-feed introduction procedure whereby the composition was first heated up and conditioned by contacting it with pure hydrogen at the operating pressure and at a temperature in the range of from 149° C. (300° F.) to 204° C. (400° F.) for a time period of about 12 hours. Following this hydrogen treatment, the composition was sulfided using a liquid hydrocarbon of a gas oil boiling in diesel range containing DMDS to provide a sulfur content of 2.5% in the sulfiding feed.

The activity of the compositions was tested by charging the reactors with a blended feedstock of a VGO (vacuum gas oil) boiling range. The feedstock had a sulfur content of 3.32 wt. %, a nitrogen content of 0.231 wt. %, and it was charged to the reactor, which was operated at a pressure of 1400 psig, at a rate so as to provide a liquid hourly space velocity (LHSV) of 0.75 hr$^{-1}$. The hydrogen gas rate charged to the reactor was 3500 scf H$_2$/bbl. The weight average bed temperature (WABT) was normalized for 260 ppm product nitrogen target.

FIG. 2 presents the results of the testing with activity determined as the WABT required to achieve targeted 260 ppm nitrogen content in the product. It can be observed from the presented plots that the inventive Composition C exhibits a higher activity (a lower WABT for the given HDN level) than inventive Composition B and comparative Composition A. Composition C provided 68 ppm total nitrogen in the product whereas the Composition B showed a 125 ppm total nitrogen in the product that translates into a 5.5° C. (10° F.) temperature advantage of the inventive Composition C filled with a blend of DMF and hexadecylamine over inventive Composition B filled with DMF alone.

That which is claimed is:

1. A hydroprocessing process, comprising: contacting under hydroprocessing reaction conditions a hydrocarbon feedstock with a catalyst composition, comprising a shaped support formed from a mixture comprising an inorganic oxide powder and catalyst fines in an amount in the range upwardly to about 50 wt %; at least one metal component incorporated into said shaped support; a chelating agent; and a polar additive; wherein the fraction of the total pore volume of said shaped support that is contained in marcopores exceeds 10% and at least 75% of the available pore volume of said shaped support is filled with said polar additive.

2. A hydroprocessing process as recited in claim 1, wherein said chelating agent is selected from the group of compounds consisting of aminocarboxylic acids, polyamines, aminoalcohols, oximes, and polyethyleneimines.

3. A hydroprocessing process as recited in claim 2, wherein said polar additive is a heterocompound having polarity and a dipole moment of at least 0.45.

4. A hydroprocessing process as recited in claim 3, wherein said at least one metal component comprises a Group 9 or Group 10 metal component selected from the group consisting of cobalt and nickel present in an amount in the range of from 0.5 wt. % to 20 wt. %, and a Group 6 metal component selected from the group consisting of molybdenum and tungsten present in an amount in the range of from 5 wt. % to 50 wt. %, wherein the weight percents are based on the weight of the dry shaped support with the metal component as the element regardless of its actual form.

5. A hydroprocessing process as recited in claim 4, wherein said inorganic oxide powder of said shaped support is a porous refractory oxide selected from the group of refractory oxides consisting of silica, alumina, titania, zirconia, silica-alumina, silica-titania, silica-zirconia, titania-alumina, zirconia-alumina, silica-titania and combinations of two or more thereof; and wherein said shaped support has a surface area (as determined by the BET method) in the range of from 50 m$^2$/g to 450 m$^2$/g, a mean pore diameter in the range of from 50 to 200 angstroms (Å), and a total pore volume exceeding 0.55 cc/g.

6. A process, comprising: contacting under hydroprocessing reaction conditions a hydrocarbon feedstock a composition made by the method comprising:

forming a shaped support comprising an inorganic oxide powder and catalyst fines, wherein said catalyst fines are present in said shaped support in an amount in the range up to 50 wt % of said shaped support, wherein the fraction of the total pore volume of the shaped support that is contained in macropores exceeds 10%, and wherein said shaped support is dried and calcined;

incorporating a chelating agent and a metal-containing solution into said shaped support to provide a chelant treated metal-incorporated support;

drying said chelant treated metal-incorporated support so as to provide a dried chelant treated metal-incorporated support having a volatiles content in the range of from 1 to 20 wt % LOI thereby creating an available pore volume; and incorporating a polar additive into said dried chelant treated metal-incorporated support in an amount such that at least 75% of the available pore volume of said dried chelant treated metal-incorporated support is filled with said polar additive, to thereby provide an additive impregnated composition.

* * * * *